(12) United States Patent
Ueno

(10) Patent No.: US 9,964,445 B1
(45) Date of Patent: May 8, 2018

(54) COLOR-MATCHING APPARATUS AND COLOR-MATCHING METHOD FOR REPAIR PAINT

(71) Applicant: CAR CONVENI CLUB CO., LTD., Minato-ku, Tokyo (JP)

(72) Inventor: Makoto Ueno, Miyagi (JP)

(73) Assignee: CAR CONVENI CLUB CO., LTD, Minato-ku, Tokyo (JP)

( * ) Notice: Subject to any disclaimer, the term of this patent is extended or adjusted under 35 U.S.C. 154(b) by 0 days. days.

(21) Appl. No.: 15/578,573

(22) PCT Filed: May 27, 2016

(86) PCT No.: PCT/JP2016/065686
§ 371 (c)(1),
(2) Date: Nov. 30, 2017

(87) PCT Pub. No.: WO2016/194799
PCT Pub. Date: Dec. 8, 2016

(30) Foreign Application Priority Data

Jun. 5, 2015 (JP) ................................ 2015-114623

(51) Int. Cl.
*G01J 3/46* (2006.01)
*B05D 5/00* (2006.01)

(52) U.S. Cl.
CPC .............. *G01J 3/463* (2013.01); *B05D 5/005* (2013.01); *G01J 2003/467* (2013.01)

(58) Field of Classification Search
CPC ........ G01J 3/46; G01J 3/463; G01J 2003/467; B05D 3/00; B05D 5/005; B05D 7/00;
(Continued)

(56) References Cited

U.S. PATENT DOCUMENTS 6,539,325 B1 * 3/2003 Numata .................... G01J 3/46
356/402
2007/0003691 A1 * 1/2007 Rodrigues .............. B05D 5/005
427/140

(Continued)

FOREIGN PATENT DOCUMENTS

JP 62-022870 A 1/1987
JP 10-324829 A 12/1988
(Continued)

OTHER PUBLICATIONS

International Preliminary Report on Patentability for PCT/JP2016/065686 dated Dec. 5, 2017.

*Primary Examiner* — Jamil Ahmed
(74) *Attorney, Agent, or Firm* — Bruzga & Associates; Charles E. Bruzga; Shiomo S. Moshen

(57) ABSTRACT

Provided are a color-matching apparatus and a color-matching method for a repair paint capable of sufficiently supporting a color-matching operation that has been conventionally performed by experience and intuition, mainly at an automobile repair shop. The color-matching apparatus and the color-matching method for a repair paint calculates, for each coordinate axis, an error between colorimetric data of a painting object portion and colorimetric data of a painting plate (S3), retrieves, for each coordinate axis, a mixed paint having characteristic information acting in a direction of reducing the error as a color-matching candidate (S5), calculate a basic amount of the color-matching candidate corresponding to an amount of the repair paint used for painting the painting object portion (S7), calculate, for each coordinate axis, an error rate by dividing the error by a reference value corresponding to the colorimetric data (S8), and calculate a color-matching amount for each color- (Continued)

matching candidate by multiplying the basic amount of the color-matching candidate by the error rate (S10).

12 Claims, 4 Drawing Sheets

(58) Field of Classification Search
CPC .......... G09B 19/00; G06F 19/00; G01D 1/00; G01N 21/25
See application file for complete search history.

(56) References Cited

U.S. PATENT DOCUMENTS

| | | | |
|---|---|---|---|
| 2010/0239752 A1* | 9/2010 | Serizawa | B05D 5/005 427/140 |
| 2011/0097691 A1* | 4/2011 | Bornemann | G01J 3/46 434/98 |

FOREIGN PATENT DOCUMENTS

| | | |
|---|---|---|
| JP | 2003-034762 A | 2/2003 |
| JP | 2005-200590 A | 7/2005 |
| JP | 2010-024359 A | 2/2010 |
| JP | 2010-536046 A | 11/2010 |
| WO | 2006/101193 A1 | 9/2006 |

* cited by examiner

[FIG. 1]
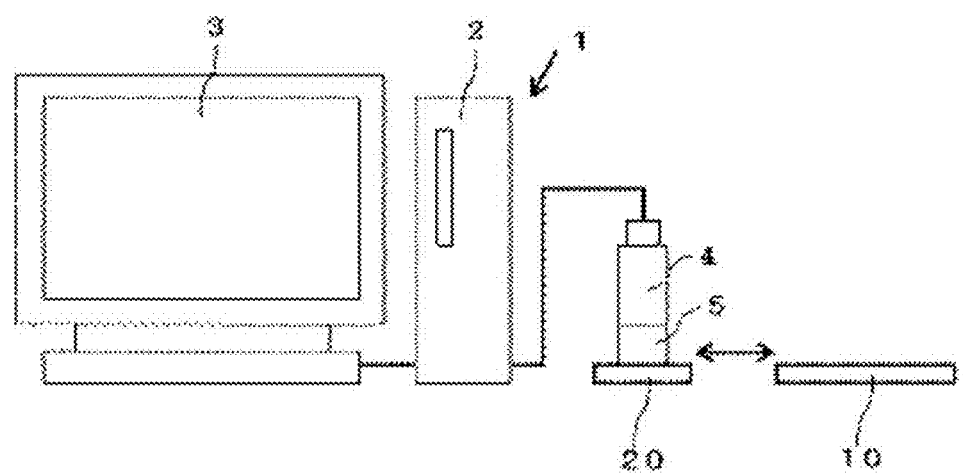

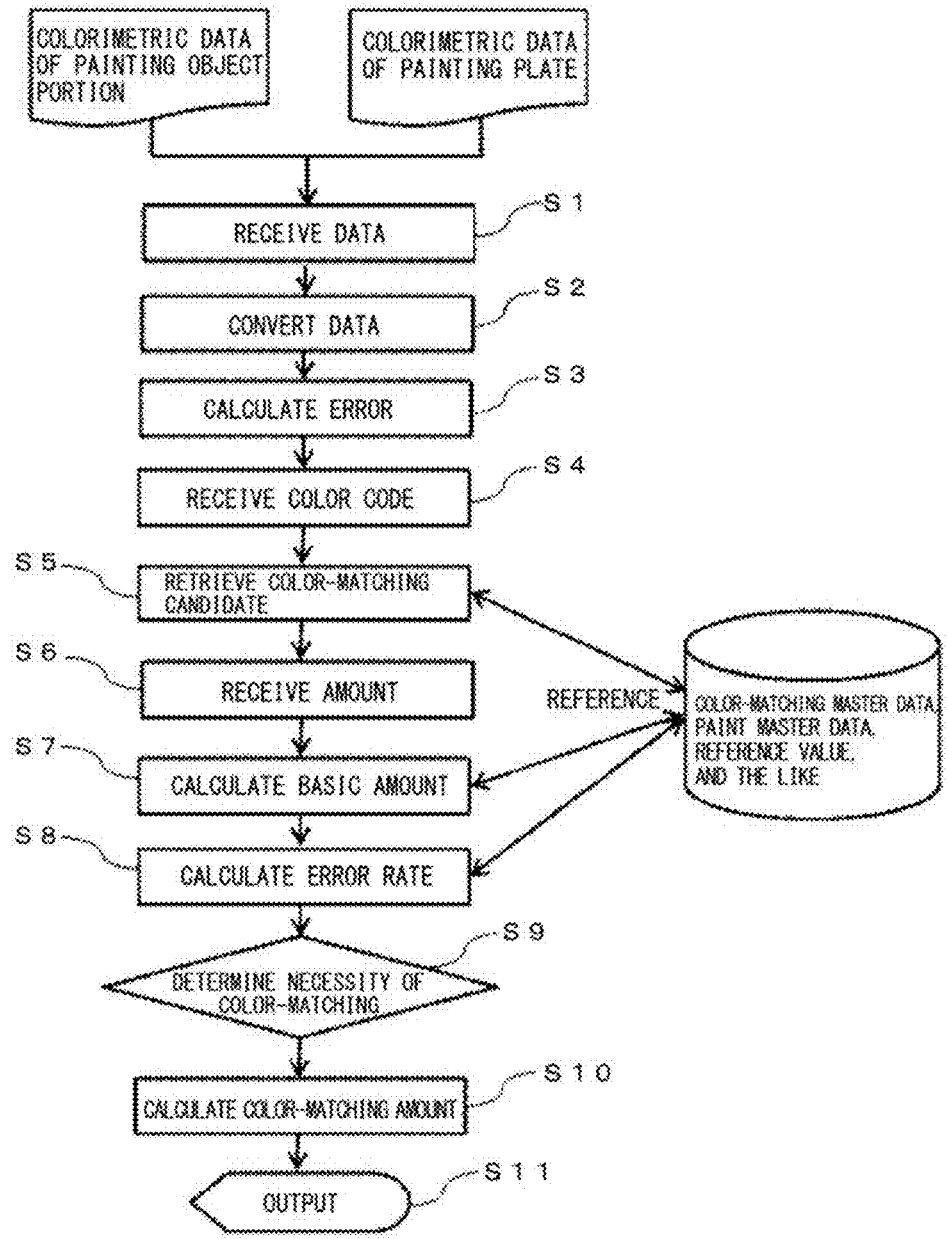

[FIG. 3]

COLOR NO. B589P-2

AMOUNT 95.0

CONFIRM

MIXING LIST

| PAINT CODE | MIXING VALUE | MANUFACTURER | LIGHT/DARK | RED | GREEN | YELLOW | BLUE | L* | a* | b* |
|---|---|---|---|---|---|---|---|---|---|---|
| 0250 | 3955 | ROCK |  | 1 |  |  |  | 12 | 0 | 7 |
| 0048 | 1596 | ROCK |  |  | 1 |  |  | 43 | 36 | 0 |
| 4336 | 1108 | ROCK | 1 |  |  | 1 | 1 | 61 | 6 | -15 |
| 0079 | 818 | ROCK |  |  |  |  | 1 | 13 | 13 | -17 |
| 0030 | 755 | ROCK |  | 1 |  |  |  | 33 | 6 | 2 |
| 0036 | 728 | ROCK |  | 1 | 1 |  |  | 32 | 6 | 5 |
| 4006 | 656 | ROCK | 1 |  |  |  |  | 54 | 6 | -14 |
| 0095 | 384 | ROCK |  | 1 |  |  |  |  |  |  |

[FIG. 4]
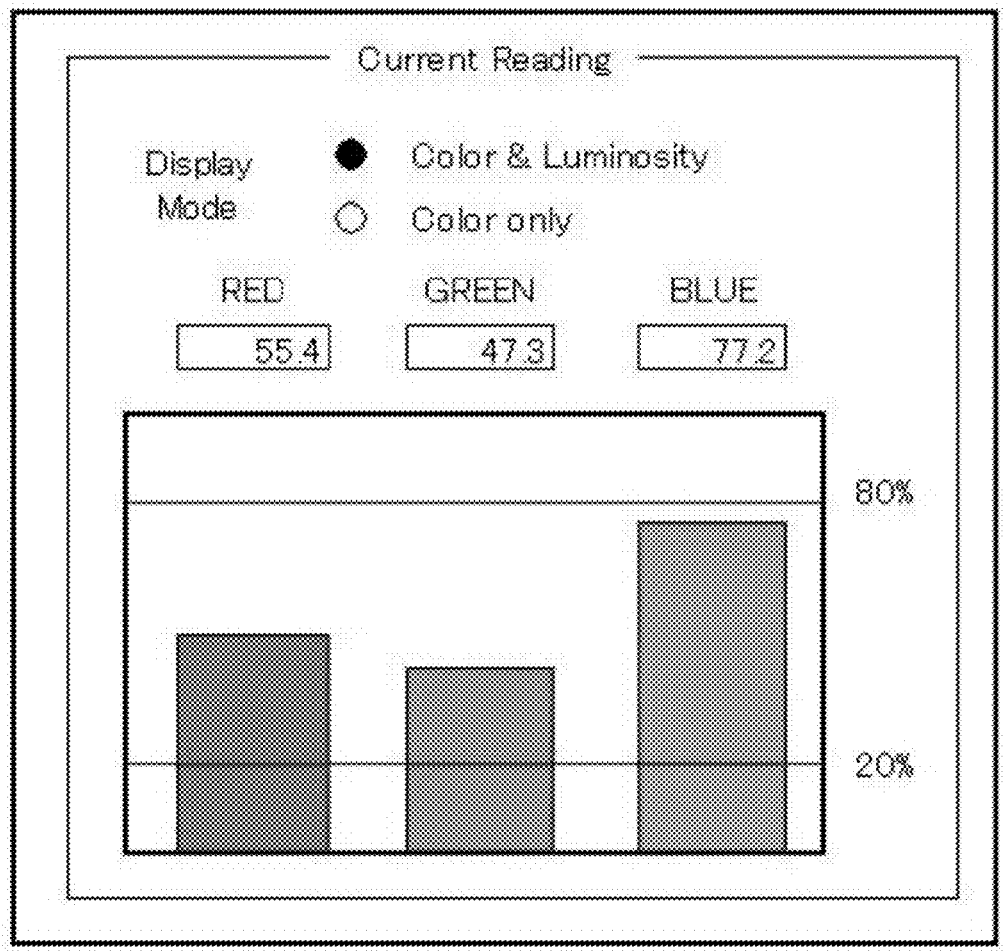

COLOR-MATCHING APPARATUS AND COLOR-MATCHING METHOD FOR REPAIR PAINT

TECHNICAL FIELD

The present invention relates to a color-matching apparatus and a color-matching method for a repair paint, and mainly relates to a color-matching apparatus and a color-matching method which are suitable for color-matching of a repair paint performed in a repairing operation of painting of an automobile.

BACKGROUND ART

When partial painting is performed on an automobile brought in for repair, it is necessary to perform matching of a color (color-matching) of a repair paint in accordance with a paint color of a painting object portion of a repair vehicle.

Automobile manufacturers specify color codes for each automobile and provide information regarding mixed paints and mixing values of paints used for painting. Paint manufacturers provide, for each of the specified color codes, information (master color data) regarding paints to be mixed (paint codes), a mixing value (mixing ratio) of each mixed paint, and the like for preparation of the repair paint by use of paints manufactured and sold by each paint manufacturer.

Meanwhile, there are various methods of storing and using a vehicle by vehicle purchasers, and aged deterioration of painting of the repair vehicle differs for each vehicle and each portion thereof. In addition, in some cases, there is a difference in painting of the vehicle from a manufacturing stage due to differences in a painting method, a painting environment, and the like at an automobile manufacturing line (so-called lot-to-lot variation). As described above, since a paint color on the repair vehicle varies, even if the color code of the automobile is the same, it is not possible to prepare a repair paint conforming to the painting object portion of the repair vehicle merely by blending the paints in accordance with the master color data provided by the paint manufacturer.

Accordingly, even if it is possible to prepare a repair paint which is approximate to the paint color of the repair vehicle to a certain extent by performing blending in accordance with the master color data, it is generally necessary to perform a color-matching operation for each painting object portion of the repair vehicle. Conventionally, this color-matching operation has been performed depending on experience and intuition of an operator while using a color sample book. In recent years, however, there are cases where a colorimeter is introduced to perform the color-matching operation. Several paint manufacturers have provided color-matching support systems with a computer color searching (CCS) function or a computer color matching (CCM) function.

In a presently provided color-matching support system, a large number of pieces of master color data is put into a database, and master color data for which a color difference from colorimetric data (for example, $L^*a^*b^*$ value) of the repair vehicle measured by the colorimeter is the smallest is retrieved and displayed (for example, see paragraph [0038] of Patent Literature 1). In many cases, however, painting cannot be performed without color-matching, merely by retrieving and displaying the master color data for which the color difference is the smallest. To address such a problem, the paint manufacturers are trying to enrich the database by creating a plurality of color variations made by slightly changing the color of one color code, and registering these variations in the database as variations that can be used for painting on the repair vehicle, such that a candidate for a color that minimizes the color difference is selected as much as possible. As long as a search target is limited to information registered in the database, however, the problem that the paint conforming to the painting object portion of the repair vehicle is not always retrieved and displayed cannot be solved. For this reason, the operator's color-matching operation has not been sufficiently supported, and at a painting site, the operator often had to find a paint and a color-matching amount to be added from among many paints, depending on his/her experience and intuition.

In addition, a painting state changes according to a painting method such as a distance between a spray gun used for painting and the painting object portion, and speed at which the spray gun is moved, a painting tool used for painting, and painting skill, a habit, and the like of the operator. Accordingly, even if exactly the same paint is used, there will be a difference in a shade and a color tone after painting is performed. It is practically impossible to prepare a repair paint that can deal with all of the above-mentioned matters and put such a repair paint in a database. In the color sample book used at the painting site, painting plates prepared by the paint manufacturer on the basis of the mixed paints and the mixing values of the color codes. Since, however, the painting method by the paint manufacturer and the painting environment are not the same as those at each painting site, it is not always possible to reproduce the same shade and color tone expressed in the color sample book. For this reason, the operators' color-matching operation has not been sufficiently supported, and at the painting site, the operator often had to find a paint and a color-matching amount to be added from among many paints, depending on their experience and intuition.

Currently applicable colorimeters irradiate the painting object portion with light at constant luminance to measure its reflected light. Since, however, reflectance or absorptance of light varies depending on an object color, if the luminance is kept constant, an original color of the painting object portion cannot be measured accurately. In particular, a luster pigment (luster material) such as an aluminum flake pigment (metallic painting) and a pearl pigment (pearl painting, mica painting) is often added to a paint for an automobile, and these additives produce multiple reflection gloss due to difference in refractive index. Accordingly, the original color of the painting object portion cannot be measured accurately if the color is measured always at a constant luminance.

CITATION LIST

Patent Literature

Patent Literature 1: Japanese Patent Application Laid-Open No. 2005-200590

SUMMARY OF INVENTION

Technical Problem

As mentioned above, the search and display by the conventional color-matching support system is not capable of sufficiently supporting the operator's color-matching operation, and at the painting site, the operator often had to find the paint and the color-matching amount to be added from among many paints, depending on his/her experience and intuition. In addition, since the painting method and the painting environment are different for each painting site and each operator, each operator often had to find the paint and the color-matching amount to be added from among many paints, depending on his/her experience and intuition.

In view of these conventional drawbacks, a major object of the present invention is to provide a color-matching apparatus and a color-matching method for a repair paint that are capable of sufficiently supporting a color-matching operation of the repair paint that has been conventionally performed by experience and intuition of an operator at an automobile repair shop.

Solution to Problem

A color-matching apparatus for a repair paint of the present invention includes: storage means configured to store mixed paints and mixing values for each color code, store, for each mixed paint, characteristic information corresponding to each coordinate axis of a color system constituting a color space, and store a predetermined value set as a reference value for each interval arbitrarily provided on each coordinate axis; data receiving means configured to receive inputs of colorimetric data of a painting object portion and colorimetric data of a painting plate to which a desired amount of the repair paint is applied, the repair paint being prepared on the basis of a color code of the painting object portion; error calculating means configured to calculate, for each coordinate axis, an error between the colorimetric data of the painting plate and the colorimetric data of the painting object portion; color-matching candidate retrieving means configured to refer to the characteristic information stored in the storage means and retrieve, for each coordinate axis, a mixed paint having characteristic information acting in a direction of reducing the error as a color-matching candidate; amount receiving means configured to receive an input of an amount of the repair paint used for painting the painting object portion; basic amount calculating means configured to refer to the mixing values stored in the storage means and calculate a basic amount of the color-matching candidate corresponding to the amount; error rate calculating means configured to calculate, for each coordinate axis, an error rate by reading, for each coordinate axis, the reference value set for the interval including a value of the colorimetric data of the painting object portion from the storage means, and dividing the error for each coordinate axis calculated by the error calculating means by the read reference value; and color-matching amount calculating means configured to calculate, for each coordinate axis, a color-matching amount of the color-matching candidate by multiplying the basic amount of the color-matching candidate calculated by the basic amount calculating means by the error rate calculated by the error rate calculating means. With this configuration, a candidate for the mixed paint having the characteristic information acting in the direction of reducing the error for each coordinate axis, that is, a candidate for the mixed paint which can be made closer to a paint color of the painting object portion by additional color-matching can be retrieved from the mixed paints registered by the storage means, and a color-matching amount to be added can be concretely calculated for the mixed paint serving as the color-matching candidate.

Further, in the color-matching apparatus for a repair paint of the present invention, arbitrarily, in a case where the color-matching candidate is not retrieved from the mixed paints contained in the repair paint applied to the painting plate, the color-matching candidate retrieving means may search mixed paints of other color codes which are permitted to be applied to the painting object portion for the color-matching candidate. With this configuration, it is possible to retrieve the color-matching candidate beyond a range of the mixed paint applied to the painting plate.

Further, in the color-matching apparatus for a repair paint of the present invention, arbitrarily, the colorimetric data, the input of which is received by the data receiving means, may be obtained by measuring a color of the painting object portion or the painting plate serving as a colorimetric object while changing luminance according to reflectance or absorptance of the painting object portion or the painting plate by using a spectrocolorimeter capable of changing luminance. With this configuration, an original color of the colorimetric object (for example, the repair vehicle, the painting plate, and a color sample book) can be measured accurately, and a repair paint conforming to a painting object portion such as the painting object portion of the repair vehicle can be accurately prepared.

A color-matching method for a repair paint of the present invention includes: a data receiving step of receiving inputs of colorimetric data of a painting object portion and colorimetric data of a painting plate to which a desired amount of the repair paint is applied, the repair paint being prepared on the basis of a color code of the painting object portion; an error calculating step of calculating, for each coordinate axis of a color system constituting a color space, an error between the colorimetric data of the painting plate and the colorimetric data of the painting object portion; a color-matching candidate retrieving step of referring to a storage unit configured to store, for each color code, mixed paints and mixing values, and store, for each mixed paint, characteristic information corresponding to each coordinate axis, and retrieving, for each coordinate axis, a mixed paint having characteristic information acting in a direction of reducing the error as a color-matching candidate; an amount receiving step of receiving an input of an amount of the repair paint used for painting the painting object portion; a basic amount calculating step of referring to the mixing values stored in the storage unit and calculating a basic amount of the color-matching candidate corresponding to the amount; an error rate calculating step of calculating, for each coordinate axis, an error rate by referring to the storage unit configured to store a predetermined value set as a reference value for each interval arbitrarily provided on each coordinate axis, reading, for each coordinate axis, a reference value corresponding to the colorimetric data of the painting object portion, and dividing the error for each coordinate axis calculated in the error calculating step by the read reference value; and a color-matching amount calculating step of calculating, for each coordinate axis, a color-matching amount of the color-matching candidate by multiplying the basic amount of the color-matching candidate calculated in the basic amount calculating step by the error rate calculated in the error rate calculating step. With this configuration, the mixed paint having the characteristic information acting in the direction of reducing the error for each coordinate axis, that is, the mixed paint which can be made closer to the paint color of the painting object portion by additional color-matching can be retrieved as the color-matching candidate from the mixed paints stored by the storage unit, and the color-matching amount to be added can be concretely calculated for the mixed paint serving as the color-matching candidate.

Further, in the color-matching method for a repair paint of the present invention, arbitrarily, the amount receiving step may receive an input of a remaining amount of a repairing paint which is expended by painting on the painting plate as the amount. With this configuration, the basic amount calculating step determines a basic amount of the mixed paint contained in the remaining repair paint, and accordingly, color-matching can be performed in consideration of an amount of the paint consumed in preparation of the painting plate.

Further, in the color-matching method for a repair paint of the present invention, arbitrarily, in a case where the color-matching candidate is not retrieved from the mixed paints contained in the repair paint applied to the painting plate, the color-matching candidate retrieving step may search mixed paints of other color codes which are permitted to be applied to the painting object portion for the color-matching candidate. With this configuration, it is possible to retrieve the color-matching candidate beyond a range of the mixed paint applied to the painting plate.

Further, in the color-matching method for a repair paint of the present invention, arbitrarily, the colorimetric data, the input of which is received in the data receiving step, may be obtained by measuring a color of the painting object portion or the painting plate serving as a colorimetric object while changing luminance according to reflectance or absorptance of the painting object portion or the painting plate by using a spectrocolorimeter capable of changing luminance. With this configuration, the original color of the colorimetric object (for the example, the repair vehicle, the painting plate, and the color sample book) can be measured accurately, and the repair paint conforming to the painting object portion (for example, the painting object portion of the repair vehicle) can be accurately prepared.

Advantageous Effects of Invention

According to the present invention, a paint to be added for color-matching can be retrieved from among many paints and a color-matching amount can be concretely calculated, and therefore the present invention can mainly provide a sufficient support for a color-matching operation of a repair paint which has been conventionally performed by experience and intuition of an operator at an automobile repair shop.

BRIEF DESCRIPTION OF DRAWINGS

FIG. 1 is a configuration diagram of a color-matching apparatus as an embodiment of the present invention.

FIG. 2 is a flowchart of processing steps in the color-matching apparatus as the embodiment of the present invention.

FIG. 3 is a condition input screen of the color-matching apparatus as the embodiment of the present invention.

FIG. 4 is an image diagram of a demonstration screen of a software attached to a color sensor manufactured by EMX Industries, inc.

DESCRIPTION OF EMBODIMENTS

Hereinafter, a color-matching method for a repair paint for an automobile as an embodiment of the present invention and a color-matching apparatus 1 to which the color-matching method is applied will be described. Note that, although in the present embodiment, a color system constituting a color space is an L*a*b color system, the present invention can also be applied to other color systems such as an XYZ color system and an RGB color system.

FIG. 1 is a configuration diagram of the color-matching apparatus 1 as an embodiment of the present invention. The color-matching apparatus 1 includes a computer main body 2 having a storage unit, an arithmetic unit, a control unit, and the like, and a full-color monitor 3 serving as means for displaying various data and calculation results. As the computer main body 2 and the full-color monitor 3, a personal computer usually commercially available can be used. Note that the color-matching apparatus and the color-matching method for a repair paint of the present invention can also be integrated with a colorimeter by being incorporated in the colorimeter including functions of storage, computation, control, input/output, and the like.

The storage unit serving as storage means stores a color-matching master data sheet (Table 1), a paint master data sheet (Table 2), and a reference value table (Table 3). In the present embodiment, as indicated in Tables 1 and 2, the mixed paint is managed on the basis of a paint code of a four-digit number, but this is merely an example.

In the color-matching master data sheet (Table 1), pieces of information regarding color codes, paint codes of the mixed paints, mixing values of the mixed paints, and applicability of each mixed paint are registered. These pieces of information can be arbitrarily added, changed, or deleted.

TABLE 1

| Color code | Paint code | Mixing value | Applicability |
| --- | --- | --- | --- |
| B589P-1 | 0030 | 642 | APPLY |
|  | 0036 | 986 | APPLY |
|  | 0083 | 1646 | APPLY |
|  | 0095 | 530 | APPLY |
|  | 0250 | 4176 | APPLY |
|  | 4006 | 658 | APPLY |
|  | 4336 | 614 | APPLY |
|  | 4342 | 748 | APPLY |
| B589P-2 | 0030 | 755 | APPLY |
|  | 0036 | 728 | APPLY |
|  | 0048 | 1596 | APPLY |
|  | 0079 | 818 | APPLY |
|  | 0095 | 384 | APPLY |
|  | 0250 | 3955 | APPLY |
|  | 4006 | 656 | APPLY |
|  | 4336 | 1108 | APPLY |
| B589P-3 | 0030 | 3400 | APPLY |
|  | 0036 | 864 | APPLY |
|  | 0078 | 278 | APPLY |
|  | 0083 | 1574 | APPLY |
|  | 0095 | 679 | APPLY |
| ... | ... | ... | ... |

The color codes, the paint codes and the mixing values indicated in Table 1 are pieces of information registered with reference to master color data provided by a paint manufacturer. The color-matching apparatus 1 is scheduled to be use at each automobile repair shop. Therefore, information regarding an automobile which is highly likely to be brought in is mainly registered. Note that, in a case where a type of the automobile which was brought in has not been registered, registration information can be appropriately added by use of the master color data provided by the paint manufacturer.

As indicated in Table 1, in the storage unit, a plurality of mixed paints and the mixing values for the mixed paints are stored for each color code. The mixing value is, in other words, a mixing ratio of each mixed paint, and stores information that in a case where, for example, an amount of a color code "B589P-1" is set to 10000 (g), a repair paint can be prepared by blending 642 g of a paint code "0030", 986 g of a paint code "0036", 1646 g of a paint code "0083", 530 g of a paint code "0095", 4176 g of a paint code "0250", 658 g of a paint code "4006", 614 g of paint code "4336", 748 g of paint code "4342".

As mentioned in Background Art, the paint manufacturer creates a plurality of color variations (for example, B589P-1 to B589P-3) made by slightly changing the color of one color code (for example, B589P), and while permitting application of these variations as well to the painting object portion of the repair vehicle, provides a user with information regarding the mixed paints and the mixing values of the mixed paints of these variations. In a case where the information regarding these variations is provided, the number of objects to be retrieved as the color-matching candidates can be increased preferably by registration of the information as well in the color-matching master data sheet. Although not indicated, a lot of other color codes (for example, B568M and B594P) are also registered in the color-matching master data sheet. By giving a common code "B589P", it is possible to retrieve a color code which is permitted to be applied to the painting object portion in distinction from other color codes (for example, B568M and B594P).

"APPLY" described in a column of applicability means that the paint is applicable at each repair site. The applicability can be set for each mixed paint since there are cases where paints applicable at each repair site such as an automobile repair shop are limited due to discontinuation of manufacturing and problems regarding inventory management and purchase cost.

In the paint master data sheet (Table 2), information regarding the paint codes, applicability, paint manufacturers, characteristic information, colorimetric data of the color sample book, and remarks is registered. These pieces of information can be arbitrarily added, changed, or deleted. In a column of remarks, optional information such as a common name of the mixed paint can be registered. As mentioned above, in the present embodiment, the mixed paint is managed on the basis of the paint code, but the mixed paint can be managed on the basis of any other information as long as each mixed paint can be identified. For example, management and search may be performed by use of the common name of the mixed paint described in the column of remarks.

The storage unit stores, for each mixed paint, the characteristic information corresponding to each coordinate axis of the color system constituting the color space. In the present embodiment, the color system constituting the color space is the L*a*b* color system, and coordinate axes thereof are three axes of an L* axis, an a* axis, and a b* axis. That is, the storage unit stores, for each mixed paint managed on the basis of the paint code, information regarding characteristics of the mixed paint corresponding to the L* axis, the a* axis, and the b* axis. In the L*a*b* color system, an L* value represents brightness, and an a* value and a b* value represent chromaticity. In the present embodiment, as indicated in Table 2, "light" and "dark" are set as information regarding the characteristics of the mixed paint corresponding to the L* axis, "red" and "green" are set as information regarding the characteristics of the mixed paint corresponding to the a* axis, and "yellow" and "blue" are set as information regarding the characteristics of the mixed paint corresponding to the b* axis. These pieces of characteristic information are arbitrarily set on the basis of a flip-flop list, primary color flap information, and the like provided by the paint manufacturer. For example, since a paint code "0010" represents a reddish paint, a check mark is added in a column of "Red", and since a paint code "0088" represents a paint that increases the brightness, a check mark is added to a column of "Light".

In addition, color data (the L* value, the a* value, and the b* value) obtained by measurement of colors in the color sample book of each paint code (for example, "Auto Paint Colors" issued by Japan Paint Manufacturers Association) is stored as the colorimetric data of the color sample book. Note that the color data indicated in Table 2 was measured by the inventor.

In the reference value table (Table 3), information regarding reference values set at arbitrary values or intervals for each coordinate axis is registered. In the present embodiment, the reference values are set at arbitrary intervals in a range of [0 to +100] for each coordinate axis. Note that, as will be mentioned later, the a* value and the b* value are converted into values in a range of [−100 to +100], and accordingly, the a* value and the b* value in the reference value table may be set in the range of [−100 to +100].

TABLE 2

| Mixed code | Applicability | Paint manufacturer | Characteristic information | | | | | | Color sample book | | | Remarks |
|---|---|---|---|---|---|---|---|---|---|---|---|---|
| | | | Light | Dark | Red | Green | Yellow | Blue | L* | a* | b* | |
| 0010 | APPLY | ROCK | | | 1 | | | | 49 | 37 | 33 | Bright red |
| 0011 | APPLY | ROCK | | | 1 | | | | 54 | 40 | 55 | Vivid red |
| 0030 | APPLY | ROCK | | 1 | | | | | 33 | 6 | 2 | Tinting black |
| 0036 | APPLY | ROCK | | 1 | 1 | | | | 32 | 5 | 5 | Fast violet |
| 0037 | APPLY | ROCK | | | 1 | | | | 57 | 35 | 49 | Fast red |
| 0039 | APPLY | ROCK | | | 1 | | | | 52 | 38 | 45 | Super red |
| 0048 | APPLY | ROCK | | | 1 | | | | 43 | 36 | 0 | Magenta |
| 0049 | APPLY | ROCK | | | 1 | | | | 32 | 24 | 4 | Rose red |
| 0054 | APPLY | ROCK | | | | | 1 | | 60 | 14 | 63 | Sunny yellow |
| 0056 | APPLY | ROCK | | | | | 1 | | 78 | −18 | 77 | Bright yellow |
| 0073 | APPLY | ROCK | | | | 1 | 1 | | 80 | −22 | 67 | Lime green |
| 0076 | APPLY | ROCK | | | | 1 | | | 19 | 4 | −8 | Cyanine green |
| 0078 | APPLY | ROCK | | | | | | 1 | 23 | 29 | −42 | Deep blue |
| 0079 | APPLY | ROCK | | | | | | 1 | 13 | 13 | −17 | Cyanine blue |
| 0080 | APPLY | ROCK | | | | | | 1 | 47 | 50 | −53 | Royal blue |
| 0088 | APPLY | ROCK | 1 | | | | | | 64 | 5 | 1 | Bright M |
| 0093 | APPLY | ROCK | 1 | | | | | | 40 | 11 | −18 | Sparkle M |
| ... | ... | ... | ... | ... | ... | ... | ... | ... | ... | ... | ... | ... |

TABLE 3

| L* | | a* | | b* | |
|---|---|---|---|---|---|
| Colorimetric value | Reference value | Colorimetric value | Reference value | Colorimetric value | Reference value |
| 0~10 | 10 | 0~5 | 5 | 0~10 | 5 |
|  |  | 5~10 | 10 | 5~10 | 10 |
| 10~20 | 20 | 10~15 | 15 | 10~15 | 15 |
|  |  | 15~20 | 20 | 15~20 | 20 |
| 20~30 | 30 | 20~30 | 30 | 20~30 | 30 |
| 30~40 | 40 | 30~40 | 40 | 30~40 | 40 |
| 40~50 | 50 | 40~50 | 50 | 40~50 | 50 |
| 50~60 | 60 | 50~60 | 60 | 50~60 | 60 |
| 60~70 | 70 | 60~80 | 80 | 60~80 | 80 |
| 70~80 | 80 |  |  |  |  |
| 80~90 | 90 | 80~100 | 100 | 80~100 | 100 |
| 90~100 | 100 |  |  |  |  |

The "reference value" is a value for evaluating the degree of an error in the colorimetric data. The L*a*b* color system is generally considered as a color solid (color space) that evenly represents distances among colors that psychologically appear to have the same degree of color difference. However, a color difference identification limit of a human generally has a property that it becomes smaller as saturation becomes smaller and larger as the saturation becomes larger. In addition, human eyes have a property that the degree of intensity (luminous sensitivity) of perceiving light is different for each wavelength, for example, yellow light and green light are felt bright, while red light and blue light are felt dark.

For this reason, magnitude of a numerical error (ΔL*, Δa*, and Δb*) calculated by error calculating means (step) to be described later does not always represent, as viewed with human eyes, color difference between a painting object and a painting plate. That is, in a region where a color difference identification ability of a human is inferior, color-matching may be sufficient to apply the painting even in a case where the numerical error is large, and in contrast, when color difference is large for human eyes, finer color-matching may be required even in a case where the numerical error is small. In the present invention, therefore, a concept of the "reference value" is introduced to evaluate the numerical "error", and difference between colors of a painting object portion 10 of the repair vehicle and a painting plate 20 is evaluated as an "error rate". For example, the reference value can be set to a small value in a region where the difference in colors is desired to be clearly represented, such that the error rate is calculated to be large.

FIG. 2 is a flowchart of processing steps in the color-matching apparatus 1 as the embodiment of the present invention. The color-matching apparatus 1 includes, in addition to the storage unit serving as the storage means, data receiving means, data converting means, the error calculating means, color code receiving means, color-matching candidate retrieving means, amount receiving means, basic amount calculating means, error rate calculating means, color-matching necessity determining means, color-matching amount calculating means, and outputting means, and can execute steps of these means. Hereinafter, each of the processing steps (S1 to S11) will be described on the basis of FIG. 2.

<Data Receiving Step>

The data receiving means of the color-matching apparatus 1 receives an input of colorimetric data of the painting object portion 10 of the repair vehicle and colorimetric data of the painting plate 20 (S1). The painting plate 20 is prepared by application of a repair paint prepared on the basis of a mixed paint and a mixing value of a color code of the painting object portion 10. The colorimetric data is acquired by an operator by measurement of colors of the painting object portion 10 of the repair vehicle and the painting plate 20 by use of a spectrocolorimeter 4.

<Data Converting Step>

With respect to a format of the colorimetric data input in the data receiving step, the data converting means of the color-matching apparatus 1 maintains the format in a case where the format is the same as that of the color system (L*a*b* color system), and converts the format into that of the color system (L*a*b* color system) in a case where the format is different from that of the color system (L*a*b* color system) (S2). For example, in a case where the colorimetric data measured by the colorimeter is in a format of an RGB display system (R [%], G [%], and B [%]), the format is converted into the format of the L*a*b* color system by use of a conventionally known conversion formula. Furthermore, in the present embodiment, the data converting means converts the a* value and the b* value into values in the range of [−100 to +100]. Note that the present invention can also be applied to a case where the a* value and the b* value are converted into values in a range of [−60 to +60], the range being generally used.

In a case where the colorimetric data measured by the colorimeter is in the format of the L*a*b* color system, it is also possible to proceed to the next error calculating step while the format is maintained. There are cases where conversion is not necessary as described above, and in this regard, the data converting step is an arbitrary step. However, it is preferable to include the data converting step since the step can deal with various colorimetric data.

<Error Calculating Step>

The error calculating means of the color-matching apparatus 1 calculates an error between the colorimetric data of the painting plate 20 (L*2, a*2, and b*2) and the colorimetric data of the painting object portion 10 of the repair vehicle (L*1, a*1, and b*1) (for example, ΔL*=L*2−L*1, Δa*=a*2−a*1, and Δb*=b*2−b*1) for each coordinate axis (S3).

<Color Code Receiving Step>

The color code receiving means of the color-matching apparatus 1 receives an input of the color code of the painting object portion 10 of the repair vehicle (S4). The color code adopted when the painting plate 20 was prepared is input. FIG. 3 is a condition input screen as the embodiment of the present invention, which is displayed on the monitor 3. As illustrated in FIG. 3, when the color code is input into a column of "COLOR No.", reference is made to color-matching master data (Table 1) and paint master data (Table 2) that are stored in the storage unit, and a plurality of paint codes, mixing values, paint manufacturers, pieces of characteristic information, and pieces of colorimetric data of the color sample book that are corresponding to the color code are displayed in a column of the mixing list. With this configuration, the operator can confirm the information regarding the selected color code. Note that the flow shown in FIG. 2 is merely one embodiment of the present invention, and a color code receiving step (S4) may be executed before the error calculating step (S3).

<Color-Matching Candidate Retrieving Step>

The color-matching candidate retrieving means of the color-matching apparatus 1 refers to the characteristic information stored in the storage unit serving as the storage means and retrieves, for each coordinate axis, a mixed paint (paint code) having characteristic information acting in a direction of reducing the error as a color-matching candidate (S5). For example, in a case where the error is calculated as ($\Delta L^*=L^*2-L^*1$, $\Delta a^*=a^*2-a^*1$, and $\Delta b^*=b^*2-b^*1$), when the error on the L* axis ($\Delta L^*$) is a positive value (>0), a mixed paint having characteristic information that decreases the value of $L^*2$ ("dark") is retrieved, when the error on the L* axis ($\Delta L^*$) is a negative value (<0), a mixed paint having characteristic information that increases the value of $L^*2$ ("light") is retrieved, when the error on the a* axis ($\Delta a^*$) is a positive value (>0), a mixed paint having characteristic information that decreases the value of $a^*2$ ("green") is retrieved, when the error on the a* axis ($\Delta a^*$) is a negative value (<0), a mixed paint having characteristic information that increases the value of $a^*2$ ("red") is retrieved, when the error on the b* axis ($\Delta b^*$) is a positive value (>0), a mixed paint having characteristic information that decreases the value of $b^*2$ ("blue") is retrieved, and when the error on the b* axis ($\Delta b^*$) is a negative value (<0), a mixed paint having characteristic information that increases the value of $b^*2$ ("yellow") is retrieved.

According to the present embodiment, the color-matching apparatus 1 includes: the storage means that stores, for each color code, a plurality of mixed paints and a mixing value for each mixed paint and stores, for each mixed paint, characteristic information corresponding to each coordinate axis of a color system constituting a color space; the data receiving means that receives inputs of calorimetric data of the painting object portion 10, and colorimetric data of the painting plate 20 to which a desired amount of a repair paint is applied, the repair paint being prepared on the basis of a mixed paint and a mixing value of a color code of the painting object portion 10; the error calculating means that calculates, for each coordinate axis, an error between the colorimetric data of the painting plate 20 and the colorimetric data of the painting object portion 10; and the color-matching candidate retrieving means that refers to the characteristic information stored in the storage means and retrieves, for each coordinate axis, a mixed paint having characteristic information acting in a direction of reducing the error as a color-matching candidate. With this configuration, it is possible to retrieve, for each coordinate axis of the color system constituting the color space, the mixed paint having the characteristic information acting in the direction of reducing the error between the colorimetric data of the painting plate 20 and the colorimetric data of the painting object portion 10, that is, the color-matching candidate that can be made closer to the paint color of the painting object portion 10 by additional color-matching.

In the present embodiment, the color-matching candidate is preferentially retrieved from mixed paints applied to the painting plate 20, that is, mixed paints contained in a paint corresponding to the color code selected in the color code receiving means (step). However, in a case where the mixed paint having the characteristic information acting in the direction of reducing the error is not found and the color-matching candidate is not retrieved, it is also possible to retrieve mixed paints of other color codes which is permitted to be applied to the painting object portion 10, for the color-matching candidate. With this configuration, the mixed paint which is permitted to be applied by the paint manufacturer can be set as a search target even if the mixed paint is not contained in the repair paint blended when the painting plate was prepared, and accordingly, a mixed paint which is more suitable can be retrieved in color-matching. Note that the color-matching candidate retrieving means may search all mixed paints which are permitted to be applied by the paint manufacturer for a color-matching candidate from the beginning, instead of preferentially searching the mixed paints applied to the painting plate 20 for the color-matching candidate.

The color-matching master data sheet (Table 1) stores, for each paint code, information regarding applicability. In this case, the color-matching candidate retrieving means (step) can also set only mixed paints registered as applicable (registered as "APPLY") as the search target. With this configuration, in a case where there is a mixed paint that is not applicable due to discontinuation of manufacturing and problems regarding inventory management and purchase cost at each repair site such as an automobile repair shop, such a mixed paint can be excluded when the mixed paint to be the color-matching candidate is calculated.

<Amount Receiving Step>

The amount receiving means of the color-matching apparatus 1 receives an input of an amount of the repair paint used for painting the painting object portion 10 (S6). In a case Illustrated in FIG. 3, an "AMOUNT" input column is provided as the amount receiving means such that the amount of the repair paint used for painting the painting object portion 10 can be input. As the amount of the repair paint, instead of inputting an amount of the repair paint to be prepared, an amount of the repair paint consumed by preparing the painting plate 20 may be weighed and the remaining amount may be input. In the latter case, a basic amount of the mixed paint contained in the remaining repair paint is determined by the basic amount calculating means to be described later, and thus color-matching can be performed in consideration of the amount of the paint reduced by preparation of the painting plate 20. Note that the flow illustrated in FIG. 2 is merely an embodiment of the present invention, and an amount receiving step (S6) can be positioned before and after any of the steps as long as it is before a basic amount calculating step (S7).

<Basic Amount Calculating Step>

The basic amount calculating means of the color-matching apparatus 1 refers to the information regarding the mixing value stored in the color-matching master data sheet (Table 1) and calculates a basic amount of the color-matching candidate corresponding to the input amount of the repair paint (S7).

<Error Rate Calculating Step>

The error rate calculating means of the color-matching apparatus 1 calculates the error rate for each coordinate axis by calling, for each coordinate axis, a reference value corresponding to the colorimetric data of the painting plate 20 ($L^*2$, $a^*2$, and $b^*2$) or the colorimetric data of the painting object portion 10 of the repair vehicle ($L^*1$, $a^*1$, and $b^*1$) from the reference value table (Table 3), and dividing the error for each coordinate axis calculated by the error calculating means by the read reference value (S8).

In the present embodiment, since the reference value table (Table 3) is set within the range of [0 to +100], when the reference value is called, the a* value and the b* value, which are values within the range of [-100 to +100], are converted into absolute values before the reference value is called. Of course, the reference value table of the a* value and the b* value may be set within the range of [-100 to +100] from the beginning.

A calculation formula of the error rate is, for example, as follows. In order to calculate a color-matching amount to be added, the error is set as an absolute value such that the error rate is obtained as a positive value, for convenience of calculation. However, this is merely for convenience for calculation, and the present embodiment is not limited to this.

$$\text{Error rate} = (|\text{Error}|/\text{Reference value}) \times 100 [\%]$$

<Color-Matching Necessity Determining Step>

The color-matching necessity determining means of the color-matching apparatus 1 determines, for each coordinate axis, whether the error rate is equal to or less than a predetermined value (S9). In a case where the error rate is equal to or less than the predetermined value, the color-matching candidate is determined to require no color-matching and excluded from calculation targets of the color-matching amount calculating means. Note that it may be determined that color-matching is unnecessary in a case where the error calculated by the error calculating means, or color difference calculated from the colorimetric data of the painting plate 20 and the painting object portion 10 (for example, $\Delta E = \{(\Delta L^*)2 + (\Delta a^*)2 + (\Delta b^*)2\}^{1/2}$) is equal to or smaller than a predetermined value. In addition, the operator may visually make the determination and manually exclude the color-matching candidate from calculation targets, or the above-mentioned methods may be used together. As mentioned above, by exclusion of the color-matching candidate from calculation targets of the color-matching amount in a case where the error, the error rate, or the color difference is equal to or less than the predetermined value, calculation is simplified, unnecessary color-matching is eliminated, and a repair paint can be prepared in a short time. On the other hand, the color-matching amount may be calculated for all color-matching candidates unconditionally, and in that sense, a color-matching necessity determining step is an optional step for the present invention.

<Color-Matching Amount Calculating Step>

The color-matching amount calculating means of the color-matching apparatus 1 calculates, for each coordinate axis, color-matching amount of the paint serving as a color-matching candidate by multiplying the basic amount of the color-matching candidate calculated by the basic amount calculating means by the error rate calculated by the error rate calculating means (S10). In the present embodiment, in a case where there are a plurality of color-matching amounts calculated for each coordinate axis for a certain color-matching candidate, the largest color-matching amount is determined as the color-matching amount of the color-matching candidate.

According to the present embodiment, there are provided the amount receiving means that receives an input of an amount of the repair paint used for painting the painting object portion 10, the basic amount calculating means that refers to a mixing value stored in the storage means and calculates a basic amount of a color-matching candidate corresponding to the amount, the error rate calculating means that calculates an error rate for each coordinate axis by reading, for each coordinate axis, a reference value corresponding to the colorimetric data of the painting plate 20 or the painting object portion 10 from the storage means, and dividing the error for each coordinate axis calculated by the error calculating means by the read reference value, and the color-matching amount calculating means that calculates, for each coordinate axis, the color-matching amount of the color-matching candidate by multiplying the basic amount of the color-matching candidate calculated by the basic amount calculating means by the error rate calculated by the error rate calculating means. With this configuration, it is possible to calculate a color-matching amount to be added for color-matching of the painting as the color-matching candidate retrieved by the color-matching candidate retrieving means. Although the present invention utilizes a given master color data, the data itself is not output, and the color-matching amount to be added is concretely calculated by reflecting the error rate based on the colorimetric data. It is therefore possible to output an optimum color-matching amount compatible with the paint color of the painting object portion 10 beyond a limited information registered in a database. According to the present invention, since the color-matching amount to be added is concretely calculated, it is possible to provide a sufficient support for a color-matching operation which has been performed by experience and intuition of the operator.

According to the present invention, as mentioned in the amount receiving step, as the amount of the repair paint, an input of the remaining amount of the repair paint may be received, the repair paint being prepared in a desired amount on the basis of the mixed paint and the mixing value of the color code of the painting object portion 10 in order to prepare the painting plate 20. With this configuration, color-matching can be performed in consideration of the amount of painting reduced by preparing the painting plate. That is, according to the present invention, even in a case where color difference between a repair paint prepared in accordance with the master color data and the painting object portion 10 is large and painting cannot be applied without color-matching, the color-matching amount to be added to the repair paint consumed to prepare the painting plate 20 can be concretely calculated. It is therefore possible to realize color-matching without waste, without discarding the repair paint or repreparing the repair paint from scratch.

<Outputting Step>

The outputting means of the color-matching apparatus 1 displays information such as the color-matching candidate and a calculation result such as the color-matching amount of the color-matching candidate on the monitor 3 (S11). In addition, the outputting means may refer to the colorimetric data of the color sample book of the mixed paint stored in the storage means (Table 2), and may output the colorimetric data of the color sample book corresponding to the mixed paint serving as the color-matching candidate as well. Thus, the operator can finally determine necessity of color-matching by the color-matching candidate while referring to the colorimetric data on the color sample book of the same paint. That is, in the L*a*b* color system, L* represents the brightness, +a* represents a red direction, -a* represents a green direction, +b* represents a yellow direction, and -b* represents a blue direction, and for example, as a numerical value increases, the color is estimated to be vivid, and as a numerical value decreases (approaches the origin), the color is estimated to be dull. In this way, it is possible to estimate a direction and/or degree of color-matching to be performed generally from magnitude of each numerical value. Therefore, for example, in a case where a plurality of color-matching candidates are retrieved, when it is desired to correct only the brightness, the color-matching candidate is compared with the colorimetric data (L*a*b* value) of the painting object portion 10, and a color-matching candidate having less influence on hue and saturation (a*b* value) is selected. In this way, it is possible to finally determine necessity of color-matching by the color-matching candidate while referring to the colorimetric data on the color sample book of the same paint.

After performing color-matching of the repair paint on the basis of the information displayed on the monitor 3, the operator prepares a painting plate by the same painting method as in the practical case, compares a color of the painting plate with that of the painting object portion 10, and visually determines whether or not a repair paint compatible with painting is prepared. In a case where it is determined that further color-matching is necessary, the present invention can be applied again by measuring the color of the painting plate thus prepared and using the measured colorimetric data as input data. As described above, in the present invention, a repair paint compatible with the painting object portion 10 can be obtained by repeatedly performing color-matching of the repair paint once prepared, without discarding the repair paint. It is therefore possible to perform color-matching without waste.

According to the present invention, while the given master color data is utilized on the premise that a color approximate to the color of the painting object portion 10 of the repair vehicle can be obtained if the repair paint is prepared in accordance with the master color data, it is possible to retrieve a mixed paint to be added for color-matching (color-matching candidate) and calculate the color-matching amount of the color-matching candidate depending on differences depending on the repair site such as the automobile repair shop or the operator in a painting method, a painting environments, and the like. That is, the present invention can be applied to a case where, when the colors of the painting object portion 10 and the painting plate 20 are compared after blending a plurality of mixed paints in accordance with the master color data to prepare a repair paint, and performing a trial painting on the painting plate 20 by a method similar to that in the case of applying painting to the painting object portion 10, that is, the method similar to that in the practical painting, the color difference was large, and it was impossible to apply the repair paint to the painting object portion 10. In the painting operation on the painting plate 20, a painting method such as a distance between a spray gun and the painting object portion, and speed at which the spray gun is moved, a painting tool to be used, a painting environment, and painting skill and a habit of the operator are reflected on the painting (finished quality) of the painting plate 20. In a case where the color of the painting plate 20 is measured, painting plate data reflecting differences depending on the repair site such as the automobile repair shop or the operator in a painting method, a painting environment, and the like is obtained, and by calculation of the color-matching amount on the basis of the error/error rate between the colorimetric data of the painting plate 20 and the colorimetric data of the painting object portion 10, it is possible to obtain the color-matching amount compatible with the painting method, the painting environment, and the like at each repair site such as the automobile repair shop or for each operator.

Example 1

Next, a specific example of the above-described one embodiment of the present invention will be described. Example 1 shows one application example in a case where the present invention is applied when, after confirming that a color code of a painting object portion 10 is B589P, an operator selects B589P-2 as a paint which is the most likely to be compatible with B589P, blends a plurality of mixed paints in accordance with a master color data to prepare a repair paint, performs a test paint on a painting plate, and compares colors of the painting object portion and the painting plate, color difference therebetween was large, and it was impossible to paint the painting object portion. Therefore, at the time of application of the present invention, the repair paint and the painting plate prepared by use of the repair paint already exist. In the painting operation on the painting plate, a painting method such as a distance between a spray gun and the painting object portion, and speed at which the spray gun is moved, a painting tool to be used, a painting environment, and painting skill and a habit of the operator are reflected on the painting plate.

When the operator measured colors of the painting object portion and the painting plate of a repair vehicle by use of a spectrocolorimeter (trade name "Color Max-1000") to be described later, colorimetric data in a format [%] of an RGB color system (Table 4) was obtained.

TABLE 4

| | R [%] | G [%] | B [%] | L* | a* | b* |
|---|---|---|---|---|---|---|
| B589P-2 vehicle | 55.350 | 47.306 | 77.185 | 56.982 | 22.693 | −30.111 |
| B589P-2 painting plate | 55.899 | 46.757 | 77.703 | 56.818 | 24.294 | −31.080 |
| Error | | | | −0.165 | 1.600 | −0.970 |
| Reference value | | | | 60 | 30 | 40 |
| Error rate | | | | 0.27% | 5.33% | 2.42% |
| Necessity of color-matching | | | | ✓ | ✓ | ✓ |

<Data Receiving Step>

Data receiving means of a color-matching apparatus 1 receives inputs of the colorimetric data of the painting object portion of the repair vehicle (R1, G1, and B1) and the colorimetric data of the painting plate (R2, G2, and B2) (S1).

<Data Converting Step>

Since the colorimetric data input in the data receiving step is different from an L*a*b* color system, data converting means of the color-matching apparatus 1 converts a format of the colorimetric data into a format of the color system (L*a*b* color system) using a conventionally known conversion formula, and converts an a* value and a b* value into values within a range of [−100 to +100] (S2).

R1: 55.350[%]→L*1: +56.982
G1: 47.306[%]→a*1: +22.693
B1: 77.1851[%]→b*1: −30.111
R2: 55.899[%]→L*2: +56.818
G2: 46.757[%]→a*2: +24.294
B2: 77.703[%]→b*2: −31.080

<Error Calculating Step>

Error calculating means of the color-matching apparatus 1 calculates, for each coordinate axis, an error between the colorimetric data of the painting plate (L*2, a*2, and b*2) and the colorimetric data of the painting object portion of the repair vehicle (L*1, a*1, and b*1) ($\Delta L^*=L^*2-L^*1$, $\Delta a^*=a^*2-a^*1$, and $\Delta b^*=b^*2-b^*1$) (S3).

$\Delta L^*$: −0.615
$\Delta a^*$: +1.600
$\Delta b^*$: −0.790

<Color Code Receiving Step>

When a color code (B589P-2) is input into a column of "COLOR No." on a condition input screen (FIG. 3), color code receiving means receives the input of the color code (S4). Reference is made to a color-matching master data sheet (Table 1) and a paint master data sheet (Table 2), and a plurality of mixed paints (paint codes), mixing values, paint manufacturers, pieces of characteristic information, and pieces of colorimetric data of a color sample book that are corresponding to the color code are displayed in a column of the mixing list (FIG. 3). Note that a paint code "0095" represents a clear type paint which is colorless and transparent, and thus columns of L*a*b* values are blank.

<Color-Matching Candidate Retrieving Step>

Color-matching candidate retrieving means of the color-matching apparatus 1 refers to the characteristic information on the paint master data sheet (Table 2) stored in storage means and retrieves, for each coordinate axis, a mixed paint (paint code) having characteristic information acting in a direction of reducing the error as a color-matching candidate (S5). At this time, mixed paints applied to the painting plate, that is, mixed paints (paint codes) contained in a paint corresponding to the input color code (B589P-2) are preferentially retrieved as the color-matching candidates (see Table 5). In the present example, since an error on the L* axis (ΔL*) is a negative value, paint codes "4006" and "4336" having characteristic information that increases a value of L*2 ("light") are retrieved. In addition, since an error on the b* axis (Δb*) is a negative value, a mixed paint "4336" having characteristic information that increases a value of b*2 ("yellow") is retrieved. On the other hand, since an error on an a* axis (Δa*) is a positive value, a mixed paint having characteristic information that decreases a value of a*2 ("green") becomes the search target. However, such a paint is not contained in the mixed paints corresponding to the color code (B589P-2) (Nos. 1 to 8).

In a case where the mixed paint having the characteristic information acting in the direction of reducing the error is not found and the color-matching candidate is not retrieved, as described above, the search target is expanded to mixed paints of other color codes (B589P-1, B589P-3, and the like) (Nos. 9 to 16, No. 17 to . . . ) which are permitted to be applied to the painting object portion. Since the common color code (B589P) is given to the mixed paints which are permitted to be applied to the painting object portion, by setting the mixed paint having the color codes including B589P as the search target, it is possible to retrieve other color codes which are permitted to be applied to the painting object portion in distinction from color codes which are not permitted to be applied. In the present example, a mixed paint "4342" was retrieved as a mixed paint having the characteristic information that decreases the value of a*2 ("green"). Note that, as shown in the color-matching master data sheet (Table 1), since all paint codes are "APPLY", all of them are considered to be applicable and set as the search targets.

<Amount Receiving Step>

Amount receiving means of the color-matching apparatus 1 receives an input of an amount of the repair paint (S6). The amount of the paint used for repairing the repair vehicle is input into a column of "AMOUNT" on the condition input screen (FIG. 2). A remaining amount of the repair paint consumed when the painting plate was prepared may be input as the amount. In the present example, the repair paint after the painting plate was prepared weighed 95.0 (g). Therefore, "95.0 (g)" is input as the remaining amount.

<Basic Amount Calculating Step>

Basic amount calculating means of the color-matching apparatus 1 refers to the information regarding the mixing value stored in the color-matching master data sheet (Table 1) and calculates a basic amount of the color-matching candidate corresponding to the amount "95.0 (g)" (S7).

"4006" basic amount: 95.0×656/10000≈6.23 (g)

"4336" basic amount: 95.0×1108/10000≈10.53 (g)

"4342" basic amount: 95.0×748/10000≈7.11 (g)

<Error Rate Calculating Step>

Error rate calculating means of the color-matching apparatus 1 calculates, for each coordinate axis, an error rate by calling, for each coordinate axis, a reference value (60, 30, and 40) corresponding to the colorimetric data of the painting object portion 10 of the repair vehicle (56.982, 22.693, and −30.111), respectively, from the reference value table (Table 3), and dividing the error for each coordinate axis calculated by the error calculating means by the read reference value (S8, Table 4). In the present example, since the reference value table (Table 3) is set within a range of [0 to +100], when the reference value is called, for example, the b* value (−30.111) is converted into an absolute value before the reference value (40) is called.

L* error rate: 0.27 [%]
a* error rate: 5.33 [%]
b* error rate: 2.42 [%]

<Color-Matching Necessity Determining Step>

Color-matching necessity determining means of the color-matching apparatus 1 determines, for each coordinate axis,

TABLE 5

| No | Paint code | Mixing value | Manufacturer | Light | Dark | Red | Green | Yellow | Blue | L* | a* | b* | Basic amount | L* | a* | b* | Color-matching amount | Total value |
|---|---|---|---|---|---|---|---|---|---|---|---|---|---|---|---|---|---|---|
| 1 | 0030 | 755 | ROCK | | | | | | 1 | 33 | 6 | 2 | 7.17 | | | | 0.00 | 7.17 |
| 2 | 0036 | 728 | ROCK | | | 1 | 1 | | | 32 | 5 | 5 | 6.92 | | | | 0.00 | 6.92 |
| 3 | 0048 | 1596 | ROCK | | | | | 1 | | 43 | 36 | 0 | 15.16 | | | | 0.00 | 15.16 |
| 4 | 0079 | 818 | ROCK | | | | | | 1 | 13 | 13 | −17 | 7.77 | | | | 0.00 | 7.77 |
| 5 | 0095 | 384 | ROCK | 1 | | | | | | — | — | — | 3.65 | | | | 0.00 | 3.65 |
| 6 | 0250 | 3955 | ROCK | | 1 | | | | | 12 | 0 | 7 | 37.57 | | | | 0.00 | 37.57 |
| 7 | 4006 | 656 | ROCK | 1 | | | | | | 54 | 5 | −14 | 6.23 | 0.02 | | | 0.02 | 6.25 |
| 8 | 4336 | 1106 | ROCK | 1 | | | | 1 | 1 | 61 | 6 | −15 | 10.53 | 0.03 | | 0.26 | 0.26 | 10.78 |
| 9 | 0030 | 642 | ROCK | | | | | | 1 | 33 | 6 | 2 | | | | | | |
| 10 | 0036 | 986 | ROCK | | | 1 | 1 | | | 32 | 5 | 5 | | | | | | |
| 11 | 0063 | 1546 | ROCK | | | | | | 1 | 19 | 12 | −11 | | | | | | |
| 12 | 0095 | 530 | ROCK | 1 | | | | | | — | — | — | | | | | | |
| 13 | 0250 | 4176 | ROCK | | 1 | | | | | 12 | 0 | 7 | | | | | | |
| 14 | 4006 | 658 | ROCK | 1 | | | | | | 54 | 5 | −14 | | | | | | |
| 15 | 4336 | 614 | ROCK | 1 | | | | 1 | 1 | 61 | 6 | −15 | | | | | | |
| 16 | 4342 | 748 | ROCK | 1 | | 1 | 1 | | | 54 | 6 | −15 | 7.11 | | 0.38 | | 0.388 | 7.49 |
| 17 | 0030 | 3400 | ROCK | | 1 | | | | | 33 | 6 | 2 | | | | | | |
| 18 | 0036 | 864 | ROCK | | | 1 | 1 | | | 32 | 5 | 5 | | | | | | |
| 19 | 0078 | 278 | ROCK | | | | | | 1 | 23 | 29 | −42 | | | | | | |
| 20 | 0083 | 1574 | ROCK | | | | | | 1 | 19 | 12 | −11 | | | | | | |
| 21 | 0095 | 679 | ROCK | 1 | | | | | | — | — | — | | | | | | |
| 22 | ... | ... | ... | | | | | | | | | | | | | | ... ... | ... | whether the error rate is equal to or less than a predetermined value (S9). In the present example, none of the color-matching candidates was excluded from the calculation target. Note that, ticks in Table 4 indicate that it was determined that color-matching is necessary.

<Color-Matching Amount Calculating Step>

Color-matching amount calculating means of the color-matching apparatus 1 calculates, for each coordinate axis, a color-matching amount of the paint serving as the color-matching candidate by multiplying the basic amount of the color-matching candidate calculated by the basic amount calculating means by the error rate calculated by the error rate calculating means (S10).

"4006" L* color-matching amount: 6.23 (g)× 0.27[%]≈0.02[g]    (a)

"4336" L* color-matching amount: 10.53 (g)×0.27 [%]≈0.03[g]    (b)

"4342" a* color-matching amount: 7.11 (g)× 5.33[%]≈0.38[g]    (c)

"4336" b* color-matching amount: 10.53 (g)×2.42 [%]≈0.26[g]    (d)

In the present example, in a case where there are a plurality of color-matching amounts (b and d) calculated for each coordinate axis for a certain color-matching candidate "4336", the largest color-matching amount (d) is determined as the color-matching amount of the color-matching candidate. As a result of the above calculation, the following solutions are obtained (Table 5). Note that, in a case where the mixed paint retrieved as the color-matching candidate is not included in the color code selected when the painting plate was prepared, a paint which is not contained in the remaining repair paint will be blended. Normally, however, there is no problem because the amount to be blended is very small.

"4006": 0.02 [g] addition
"4336": 0.26 [g] addition
"4342": 0.38 [g] addition

<Outputting Step>

Outputting means of the color-matching apparatus 1 displays information such as the color-matching candidate, a calculation result such as the color-matching amount of the color-matching candidate, and the colorimetric data of the color sample book corresponding to the mixed paint serving as the color-matching candidate (L*a*b* value) on the monitor 3 (S11).

Example 1 shows one application example of the present invention in a case where the repair paint is prepared by blending a plurality of mixed paints in accordance with the master color data (B589P-2) of the painting object portion and the trial paint is performed on the painting plate. That is, Example 1 shows an application example of the present invention in a case where the painting plate was prepared on the basis of the mixed paint and the mixing value of the color code of the painting object portion in hopes of preparing a paint that can be applied to the painting object portion without color-matching as long as blending is performed in accordance with the master color data, but as a result of comparing the colors, the color difference is still large and the paint cannot be applied without color-matching.

Meanwhile, there is a case where it is easily predicted for reasons such as advanced discoloration of the repair vehicle that, even if the operator prepares the repair paint in accordance with the master color data, the color difference will be large and color-matching will be necessary, without the need of preparing a repair paint by way of trial to compare the colors. In this case, it is also possible to assume the painting plate prepared by the paint manufacturer and affixed to the ready-made color sample book as the painting plate prepared by the operator in accordance with the master color data, measure the color of the painting plate on the color sample book, and input the colorimetric data as painting plate data. In this case, the data receiving means of the color-matching apparatus 1 receives the input of the calorimetric data of the painting plate affixed to the color sample book as the painting plate data (S1), and with respect to the painting plate data and the colorimetric data of the painting object portion, the steps from the data converting step (S2) to the outputting step (S11) are executed with processing steps and contents that are similar to those illustrated in FIG. 2.

Here, the basic amount calculating means of the color-matching apparatus 1 can calculate, in addition to the basic amounts of the mixed paints of color-matching candidates (Nos. 7 and 8), the basic amounts of the mixed paints other than the color-matching candidates (Nos. 1 to 6) (see Table 5). In addition, the color-matching apparatus 1 can calculate total values of the basic amount of each mixed paint and the color-matching amounts of the color-matching candidates paints (Nos. 7 and 8) and display the total values on the monitor 3. Therefore, by blending the paint serving as the color-matching candidate ([4342] 0.38 g) in addition to these total values ([0030] 7.17 g, [0036] 6.92 g, [0048] 15.16 g, [0079] 7.77 g, [0095] 3.65 g, [0250] 37.57 g, [4006] 6.25 g, and [4336] 10.78 g), the operator can prepare, from a first preparation stage of the repair paint, a repair paint having a color approximate to the color of the painting object portion, as compared with the case where the repair paint is prepared in accordance with the master color data. With such a method of using the color-matching apparatus 1, it is unnecessary to forcibly perform blending in accordance with the master color data, which will require color-matching, and thus useless blending can be omitted. It is one application example of the present invention in a case where although differences in the painting skill and the habit of the operator are not reflected because the colors of the ready-made painting plates are measured, discoloration of the repair vehicle is advanced besides the difference. In a case where the operator determines that further color-matching is necessary as a result of preparing a new painting plate using the repair paint prepared by such application example and comparing the colors, it is possible to prepare a repair paint that is more compatible with the painting object portion by applying the present invention again using data obtained by measuring the color of the new painting plate as input data.

In the color-matching method and the color-matching apparatus of the present invention, it is suitable to use a spectrocolorimeter 4 capable of changing luminance. By use of the spectrocolorimeter capable of changing the luminance, the luminance can be changed in accordance with reflectance or absorptance of a colorimetric object, and color data can be measured in a state in which a color sensor has the best sensitivity characteristic. It is therefore possible to accurately measure the original color of the colorimetric object. By calculation of the color-matching amount by use of such measured data, the repair paint compatible with the painting object portion can be accurately prepared, and as a result, it is possible to sufficiently support the color-matching operation that has been conventionally performed by experience and intuition, mainly at an automobile repair shop.

As such a spectrocolorimeter 4, a color sensor manufactured by EMX Industries, Inc., USA (EMX Industries, Inc., trade name "Color Max-1000") can be used. According to an experiment by the inventor, the luminance can be set in a range of 0 to about 3400 lux. The "Color Max-1000" incorporates a high luminance white LED as a spontaneous light source and an Si photodiode as a light receiving element (light receiving elements for detecting red light, green light, and blue light). Light emitted from the high luminance white LED toward an object is reflected or transmitted by the painting object portion and is detected as RGB light intensity by each photodiode.

FIG. 4 is an image diagram of a display screen of a software attached to that color sensor. Dedicated application software is attached to the "Color Max-1000", and by installing the software on a computer main body 2, luminance of light irradiated by the "Color Max-1000" can be controlled, and an RGB value measured by the "Color Max-1000" can be displayed on the monitor 3. In a case where the "Color Max-1000" is used in a "Color & Luminosity" mode, luminosity (luminous sensitivity, brightness) for each of R, G, and B can be detected and displayed in addition to color data (RGB value).

By adjustment of a setting value of the luminance such that the luminosity of each of R, G and B falls within a range of 20 to 80(%), sensitivity of each light receiving element is optimized, and the original color of the colorimetric object to be measured can be accurately measured. For example, since a silver-based color has high reflectance, when the luminance is high, illuminance of reflected light becomes too high, and as a result, the original color of the colorimetric object to be measured cannot be accurately measured. Therefore, the luminance is lowered while confirming a value of the luminosity to be detected, such that the color data (RGB value) when the sensitivity of each light receiving element is optimized is detected. On the other hand, since a black-based color has high absorptance, the luminance is increased when measurement is performed. Also in a case where a luster pigment (luster material) such as an aluminum flake pigment (metallic painting) and a pearl pigment (pearl painting, mica painting) is added and multiple reflection gloss is produced, the color data can be detected with optimum sensitivity by use of the luminosity as an index. Therefore, the original color of the painting object portion can be accurately measured. Note that, according to the experiment of the inventor, depending on the paint, the luminosity of each of R, G and B may not fall within the range of 20 to 80(%). In this case, however, the setting value of the luminance can be adjusted such that the R value approaches a median (50%) if the paint is red, for example.

A tubular light-shielding attachment 5 is attached to the spectrocolorimeter 4. By attachment of the light-shielding attachment 5, a distance from a light source to the painting object portion and an irradiation angle can be adjusted. The spectrocolorimeter 4 can be connected to the color-matching apparatus 1 by wired connection such as a communication cable or wireless connection such as Bluetooth communication, and the colorimetric data measured by the spectrocolorimeter 4 is input into the computer main body 2 by the data receiving means. The "Color Max-1000" serving as the spectrocolorimeter 4 is a substantially cylindrical colorimeter having a diameter of about 30 mm and a length of about 110 mm, highly portable because a main body thereof has a light weight of about 180 g, and can transfer the measured colorimetric data by wireless communication. The "Color Max-1000" is therefore suitable also in terms of easy measurement of a color of a repair part of the repair vehicle.

The present invention can also be applied to any paints, as well as paints manufactured and sold by a specific paint manufacturer. Although, as mentioned in Background Art, several paint manufacturers provide color-matching support systems with CCS or CCM functions, the search target of the systems are usually limited to the paints related to manufacture and sale of the paint manufacturers. However, in the present invention, information to be registered in the color-matching master data sheet (Table 1) and the paint master data sheet (Table 2) is not limited to information regarding a certain paint manufacturer, and information regarding a plurality of paint manufacturers can be registered. Therefore, it is also possible to retrieve an optimal color-matching candidate from the information regarding other paint manufacturers.

INDUSTRIAL APPLICABILITY

Although the present invention is suitably used in a color-matching operation of a repair paint performed in a repairing operation of painting on an automobile, the present invention can also be widely used for a painting operation on general painting objects in a field in which information regarding mixed paints (paint codes) and mixing values (mixing ratios) of the paint used for painting is provided (fields of construction, printing, industrial products, and domestic products can be exemplified).

REFERENCE SIGNS LIST

1 Color-matching apparatus
2 Computer main body
3 Full-color monitor
4 Spectrocolorimeter
5 Attachment
10 Painting object portion of repair vehicle
20 Painting plate

The invention claimed is:
1. A color-matching apparatus for a repair paint, comprising:
   a) storage means configured to store mixed paints and mixing values for each color code, store, for each mixed paint, characteristic information corresponding to each coordinate axis of a color system constituting a color space, and store a predetermined value set as a reference value for each interval arbitrarily provided on each coordinate axis;
   b) data receiving means configured to receive inputs of colorimetric data of a painting object portion and colorimetric data of a painting plate to which a desired amount of the repair paint is applied, the repair paint being prepared on the basis of a color code of the painting object portion;
   c) error calculating means configured to calculate, for each coordinate axis, an error between the colorimetric data of the painting plate and the colorimetric data of the painting object portion;
   d) color-matching candidate retrieving means configured to refer to the characteristic information stored in the storage means and retrieve, for each coordinate axis, a mixed paint having characteristic information acting in a direction of reducing the error as a color-matching candidate;

e) amount receiving means configured to receive an input of an amount of the repair paint used for painting the painting object portion;
f) basic amount calculating means configured to refer to the mixing values stored in the storage means and calculate a basic amount of the color-matching candidate corresponding to the amount;
g) error rate calculating means configured to calculate, for each coordinate axis, an error rate by reading, for each coordinate axis, the reference value set for the interval including a value of the colorimetric data of the painting object portion from the storage means, and dividing the error for each coordinate axis calculated by the error calculating means by the read reference value; and
h) color-matching amount calculating means configured to calculate, for each coordinate axis, a color-matching amount of the color-matching candidate by multiplying the basic amount of the color-matching candidate calculated by the basic amount calculating means by the error rate calculated by the error rate calculating means.

2. The color-matching apparatus for a repair paint according to claim 1, wherein in a case where the color-matching candidate is not retrieved from the mixed paints contained in the repair paint applied to the painting plate, the color-matching candidate retrieving means searches mixed paints of other color codes which are permitted to be applied to the painting object portion for the color-matching candidate.

3. The color-matching apparatus for a repair paint according to claim 1, wherein the colorimetric data, the input of which is received by the data receiving means, is obtained by measuring a color of the painting object portion or the painting plate serving as a colorimetric object while changing luminance according to reflectance or absorptance of the painting object portion or the painting plate by using a spectrocolorimeter capable of changing luminance.

4. A color-matching method for a repair paint, comprising:
a) a data receiving step of receiving inputs of colorimetric data of a painting object portion and colorimetric data of a painting plate to which a desired amount of the repair paint is applied, the repair paint being prepared on the basis of a color code of the painting object portion;
b) an error calculating step of calculating, for each coordinate axis of a color system constituting a color space, an error between the colorimetric data of the painting plate and the colorimetric data of the painting object portion;
c) a color-matching candidate retrieving step of referring to a storage unit configured to store, for each color code, mixed paints and mixing values, and store, for each mixed paint, characteristic information corresponding to each coordinate axis, and retrieving, for each coordinate axis, a mixed paint having characteristic information acting in a direction of reducing the error as a color-matching candidate;
d) an amount receiving step of receiving an input of an amount of the repair paint used for painting the painting object portion;
e) a basic amount calculating step of referring to the mixing values stored in the storage unit and calculating a basic amount of the color-matching candidate corresponding to the amount;
f) an error rate calculating step of calculating, for each coordinate axis, an error rate by referring to the storage unit configured to store a predetermined value set as a reference value for each interval arbitrarily provided on each coordinate axis, reading, for each coordinate axis, a reference value corresponding to the colorimetric data of the painting object portion, and dividing the error for each coordinate axis calculated in the error calculating step by the read reference value; and
g) a color-matching amount calculating step of calculating, for each coordinate axis, a color-matching amount of the color-matching candidate by multiplying the basic amount of the color-matching candidate calculated in the basic amount calculating step by the error rate calculated in the error rate calculating step.

5. The color-matching method for a repair paint according to claim 4, wherein the amount receiving step receives, as the amount, an input of a remaining amount of the repair paint consumed by performing painting on the painting plate.

6. The color-matching method for a repair paint according to claim 4, wherein in a case where the color-matching candidate is not retrieved from the mixed paints contained in the repair paint applied to the painting plate, the color-matching candidate retrieving step searches mixed paints of other color codes which are permitted to be applied to the painting object portion for the color-matching candidate.

7. The color-matching method for a repair paint according to claim 4, wherein the colorimetric data, the input of which is received in the data receiving step, is obtained by measuring a color of the painting object portion or the painting plate serving as a colorimetric object while changing luminance according to reflectance or absorptance of the painting object portion or the painting plate by using a spectrocolorimeter capable of changing luminance.

8. The color-matching apparatus for a repair paint according to claim 2, wherein the colorimetric data, the input of which is received by the data receiving means, is obtained by measuring a color of the painting object portion or the painting plate serving as a colorimetric object while changing luminance according to reflectance or absorptance of the painting object portion or the painting plate by using a spectrocolorimeter capable of changing luminance.

9. The color-matching method for a repair paint according to claim 5, wherein in a case where the color-matching candidate is not retrieved from the mixed paints contained in the repair paint applied to the painting plate, the color-matching candidate retrieving step searches mixed paints of other color codes which are permitted to be applied to the painting object portion for the color-matching candidate.

10. The color-matching method for a repair paint according to claim 5, wherein the colorimetric data, the input of which is received in the data receiving step, is obtained by measuring a color of the painting object portion or the painting plate serving as a colorimetric object while changing luminance according to reflectance or absorptance of the painting object portion or the painting plate by using a spectrocolorimeter capable of changing luminance.

11. The color-matching method for a repair paint according to claim 6, wherein the colorimetric data, the input of which is received in the data receiving step, is obtained by measuring a color of the painting object portion or the painting plate serving as a colorimetric object while changing luminance according to reflectance or absorptance of the painting object portion or the painting plate by using a spectrocolorimeter capable of changing luminance.

12. The color-matching method for a repair paint according to claim 9, wherein the colorimetric data, the input of which is received in the data receiving step, is obtained by measuring a color of the painting object portion or the painting plate serving as a colorimetric object while changing luminance according to reflectance or absorptance of the painting object portion or the painting plate by using a spectrocolorimeter capable of changing luminance.

* * * * *